United States Patent
He et al.

(10) Patent No.: US 11,748,279 B2
(45) Date of Patent: Sep. 5, 2023

(54) SYSTEM ON CHIP, ACCESS COMMAND ROUTING METHOD, AND TERMINAL

(71) Applicant: Huawei Technologies Co., Ltd., Shenzhen (CN)

(72) Inventors: Shiming He, Shanghai (CN); Bo Sun, Shenzhen (CN); Wenmin Zhou, Beijing (CN); Zhiqiang Zhang, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 206 days.

(21) Appl. No.: 17/394,002

(22) Filed: Aug. 4, 2021

(65) Prior Publication Data
US 2021/0365392 A1 Nov. 25, 2021

Related U.S. Application Data

(63) Continuation of application No. PCT/CN2019/075754, filed on Feb. 21, 2019.

(51) Int. Cl.
*G06F 12/02* (2006.01)
*G06F 13/16* (2006.01)

(52) U.S. Cl.
CPC ........ *G06F 13/1668* (2013.01); *G06F 12/023* (2013.01); *G06F 2212/206* (2013.01)

(58) Field of Classification Search
CPC .............. G06F 13/1668; G06F 12/023; G06F 2212/206
See application file for complete search history.

(56) References Cited

U.S. PATENT DOCUMENTS

| | | | | |
|---|---|---|---|---|
| 6,249,831 | B1* | 6/2001 | Allingham | G06F 3/0689 711/E12.019 |
| 8,271,738 | B2* | 9/2012 | Fields, Jr. | G06F 9/3885 711/146 |
| 8,621,152 | B1* | 12/2013 | Chen | G06F 12/0891 711/118 |
| 8,938,585 | B1* | 1/2015 | Rohana | G06F 12/0888 710/305 |
| 9,003,159 | B2* | 4/2015 | Deshkar | G06F 12/0246 711/135 |
| 9,317,892 | B2* | 4/2016 | Veal | G11C 16/349 |
| 10,180,908 | B2* | 1/2019 | Li | G06F 12/0893 |

(Continued)

FOREIGN PATENT DOCUMENTS

| | | |
|---|---|---|
| CN | 101216751 A | 7/2008 |
| CN | 104809073 A | 7/2015 |

(Continued)

*Primary Examiner* — Cheng Yuan Tseng
(74) *Attorney, Agent, or Firm* — Slater Matsil, LLP

(57) ABSTRACT

A system on chip, an access command routing method, and a terminal are disclosed. The system on chip includes an IP core and a bus. The IP core is configured to: obtain, based on an access address corresponding to an access command, an address range configuration identifier corresponding to the access address; and transmit the access command and the address range configuration identifier to the bus, where the address range configuration identifier is used by the bus to route the access command. The bus is configured to route the access command to a system cache or an external memory based on the address range configuration identifier.

20 Claims, 4 Drawing Sheets

(56) References Cited

U.S. PATENT DOCUMENTS

| | | | |
|---|---|---|---|
| 10,474,585 B2* | 11/2019 | Lee | G06F 12/1009 |
| 11,086,778 B2* | 8/2021 | Chirca | G06F 3/064 |
| 11,347,649 B2* | 5/2022 | Bhoria | G06F 12/0215 |
| 11,436,148 B2* | 9/2022 | Jeong | G06F 12/0873 |
| 11,568,907 B2* | 1/2023 | Mathew | G11C 7/1048 |
| 11,615,022 B2* | 3/2023 | Di Gregorio | G06F 12/0815 |
| | | | 711/122 |
| 2016/0378620 A1 | 12/2016 | Sim | |
| 2019/0018786 A1 | 1/2019 | Beard et al. | |
| 2019/0121740 A1* | 4/2019 | Kabra | G06F 12/10 |
| 2020/0042242 A1* | 2/2020 | Byun | G06F 3/0604 |
| 2021/0365392 A1* | 11/2021 | He | G06F 13/1668 |
| 2023/0114164 A1* | 4/2023 | Pal | G06F 12/0891 |
| | | | 711/118 |

FOREIGN PATENT DOCUMENTS

| | | | | |
|---|---|---|---|---|
| CN | 105630727 A | 6/2016 | | |
| WO | WO-2006112111 A1 * | 10/2006 | | G06F 12/0802 |
| WO | 2009158269 A1 | 12/2009 | | |

* cited by examiner

SYSTEM ON CHIP, ACCESS COMMAND ROUTING METHOD, AND TERMINAL

CROSS-REFERENCE TO RELATED APPLICATIONS

This application is a continuation of International Application No. PCT/CN2019/075754, filed on Feb. 21, 2019, the disclosure of which is hereby incorporated by reference in its entirety.

TECHNICAL FIELD

This application relates to the field of chip technologies, and in particular, to a system on chip, an access command routing method, and a terminal.

BACKGROUND

A system on chip (SOC) chip is an integrated circuit on which a plurality of electronic systems are integrated into a same chip, and is widely used in terminal devices such as a mobile phone and a palmtop computer. The SOC usually includes a plurality of intellectual property (IP) cores, and the plurality of IP cores are connected to an external memory through a bus, to exchange a program and data. Each IP core may be considered as a pre-designed circuit functional module that is configured to implement a corresponding function. The IP core may be a central processing unit (CPU), an application processor (AP), a graphics processing unit (GPU), a multimedia subsystem (video subsystem), a camera subsystem, a wireless access module (modem), a display subsystem, or the like.

For example, a structure of an SOC may be shown in FIG. 1. In FIG. 1, an AP, a multimedia subsystem, a camera subsystem, a display subsystem, a GPU, and a wireless access module are connected to an external memory through a bus. In addition, as shown in FIG. 1, the SOC may further include a system cache (SC). The SC is a last level cache (LLC) of a system, and may be considered as an extension of the external memory. When accessing the external memory, an IP core may first access the SC. If a cache line in the SC is hit during the access, data or a response may be directly returned from the SC. Compared with off-chip access, on-chip access can obtain larger bandwidth. Therefore, using the SC can improve access efficiency to some extent.

However, in the conventional technology, querying and matching need to be first performed in the SC for all access commands. The external memory is then accessed by using the SC when the matching fails, and the SC returns data or a response to the IP core. A capacity of the SC differs greatly from a capacity of the external memory, and the capacity of the SC for storing data is limited. When this manner is used, an access hit rate of the IP core is relatively low. Therefore, in most cases, the SC needs to access the external memory to obtain data or a response, and then returns the data or the response to the IP core. This inevitably increases power consumption caused during access to a system.

In conclusion, when a solution in the conventional technology is used, an access hit rate is low, power consumption caused during access is high.

SUMMARY

Embodiments of this application provide a system on chip, an access command routing method, and a terminal, to resolve problems in the conventional technology in which an access hit rate of an IP core is low and power consumption caused during access to a chip is high.

According to a first aspect, an embodiment of this application provides a system on chip. The system on chip SOC includes an intellectual property IP core and a bus. The IP core is configured to: obtain, based on an access address corresponding to an access command, an address range configuration identifier corresponding to the access address; and transmit the access command and the address range configuration identifier to the bus, where the address range configuration identifier is used by the bus to route the access command. The bus is configured to route the access command to a system cache SC or an external memory based on the address range configuration identifier.

In the foregoing solution, the IP core obtains the address range configuration identifier corresponding to the access address, and sends the address range configuration identifier together with the access command to the bus. Therefore, after receiving the address range configuration identifier, the bus can determine whether to route the access command to the SC or to the external memory. In the foregoing solution, a case in which querying and matching need to be first performed in the SC for all access commands can be avoided, an access hit rate of the IP core can be increased, and power consumption of a system can be reduced.

Specifically, in an implementation, an address space accessed by the IP core includes a first part of address space and a second part of address space, where an address range configuration identifier corresponding to the first part of address space is a specified value, an address range configuration identifier corresponding to the second part of address space is a value other than the specified value, data correspondingly stored in the first part of address space is not suitable for storage in the SC, and data correspondingly stored in the second part of address space is suitable for storage in the SC.

In the foregoing solution, the data in the first part of address space may be routed to the external memory for processing, and the data in the second part of address space may be routed to the SC for processing. In this way, more appropriate apparatuses can be used to process data in different address spaces.

Based on the foregoing implementation, that the bus routes the access command to an SC or an external memory based on the address range configuration identifier may be specifically implemented in the following manner: The bus routes the access command to the external memory if the address range configuration identifier is the specified value; or the bus routes the access command to the SC if the address range configuration identifier is the value other than the specified value.

The foregoing solution provides a specific manner for the bus to route the access command based on the address range configuration identifier.

In a possible design, the access address is a virtual address, and that the IP core obtains, based on an access address corresponding to an access command, an address range configuration identifier corresponding to the access address may be specifically implemented in the following manner: The IP core sends the access address to a memory management unit MMU, where the MMU is configured to query a page table and obtain the address range configuration identifier corresponding to the access address, and the page table is used to record a mapping relationship between the access address and the address range configuration identifier; and the IP core receives the address range configuration identifier sent by the MMU.

The MMU queries the page table based on the access address and obtains a physical address, and the address range configuration identifier is stored in a high-order portion of the physical address.

In the foregoing solution, the IP core can obtain, through a virtual-physical address translation process of the MMU, the address range configuration identifier corresponding to the access address (namely, the virtual address).

In addition, the address range configuration identifier may alternatively be stored in a dedicated bit field of the page table.

In another possible design, the access address is a physical address, and that the IP core obtains, based on an access address corresponding to an access command, an address range configuration identifier corresponding to the access address may be specifically implemented in the following manner: The IP core queries a register based on the access address, and obtains the address range configuration identifier corresponding to the access address, where the register is disposed in the IP core and is configured to record a mapping relationship between the access address and the address range configuration identifier.

In the foregoing solution, when the access address is the physical address, the foregoing mapping relationship may be prestored in the register. When initiating the access command, the IP core may query the register for the corresponding address range configuration identifier based on the access address corresponding to the access command, and send the address range configuration identifier together with the access command to the bus.

In addition, the system on chip may further include the SC, and the SC is configured to process the access command.

In the foregoing solution, the access command may be processed by using the SC in the system on chip.

The SC may include a cache line corresponding to the access address, or may include no cache line corresponding to the access address. Therefore, the SC can process the access command in different processing manners.

Specifically, that the SC processes the access command may be specifically implemented in the following manner: If the SC includes a cache line corresponding to the access address, the SC performs data reading or writing from the SC according to the access command.

In the foregoing solution, because the SC includes the cache line corresponding to the access address, the SC does not need to allocate a new cache line for the access command when executing the access command. Regardless of whether the access command is a read command or a write command, the SC may directly perform a read or write operation on the corresponding cache line.

Specifically, in the system on chip, the bus is further configured to route the address range configuration identifier to the SC. In this case, that the SC processes the access command may be specifically implemented in the following manner: If the SC includes no cache line corresponding to the access address, the SC processes the access command according to a configuration policy corresponding to the address range configuration identifier.

In the foregoing solution, the SC may determine, according to the configuration policy corresponding to the address range configuration identifier, a specific manner of processing the access command (for example, whether to allocate a new cache line for the access command).

In the method provided in the first aspect, the configuration policy corresponding to the address range configuration identifier includes one or more of the following: an allocation policy, where the allocation policy is used to indicate that data at the access address can be stored in the SC when the access command is a read command and/or a write command; a replacement policy, used to indicate a situation in which the data at the access address is replaceable; a priority policy, used to indicate a priority of the data at the access address; and a use quota, used to indicate a maximum capacity that is used by data corresponding to the address range configuration identifier in the SC.

In addition, the SC is further configured to store the address range configuration identifier in a tag field in the cache line corresponding to the access address.

In the foregoing solution, an address range configuration identifier field in the tag field may be used to determine a corresponding configuration policy based on the address range configuration identifier; and when processing the access command, the SC may obtain the corresponding configuration policy based on the address range configuration identifier, to determine a processing manner.

According to a second aspect, an embodiment of this application provides a terminal. The terminal includes the system on chip in any one of the first aspect or any possible designs in the first aspect.

According to a third aspect, an embodiment of this application provides an access command routing method. The method includes the following steps: obtaining, based on an access address corresponding to an access command, an address range configuration identifier corresponding to the access address, where the address range configuration identifier is used by a bus to route the access command; and routing the access command to a system cache SC or an external memory based on the address range configuration identifier.

In a possible design, an address space accessed by an IP core includes a first part of address space and a second part of address space, where an address range configuration identifier corresponding to the first part of address space is a specified value, an address range configuration identifier corresponding to the second part of address space is a value other than the specified value, data correspondingly stored in the first part of address space is not suitable for storage in the SC, and data correspondingly stored in the second part of address space is suitable for storage in the SC.

In a possible design, the routing the access command to an SC or an external memory based on the address range configuration identifier includes: routing the access command to the external memory if the address range configuration identifier is the specified value; or routing the access command to the SC if the address range configuration identifier is the value other than the specified value.

In a possible design, the access address is a virtual address, and the obtaining, based on an access address corresponding to an access command, an address range configuration identifier corresponding to the access address includes: sending the access address to a memory management unit MMU, where the MMU is configured to query a page table and obtain the address range configuration identifier corresponding to the access address, and the page table is used to record a mapping relationship between the access address and the address range configuration identifier; and receiving the address range configuration identifier sent by the MMU.

The MMU queries the page table based on the access address and obtains a physical address, and the address range configuration identifier is stored in a high-order portion of the physical address.

In addition, the address range configuration identifier may alternatively be stored in a dedicated bit field of the page table.

In a possible design, the access address is a physical address, and the obtaining, based on an access address corresponding to an access command, an address range configuration identifier corresponding to the access address includes: querying a register based on the access address, and obtaining the address range configuration identifier corresponding to the access address, where the register is disposed in the IP core and is configured to record a mapping relationship between the access address and the address range configuration identifier.

In a possible design, the method further includes: processing, by the SC, the access command.

In a possible design, the processing, by the SC, the access command includes: if the SC includes a cache line corresponding to the access address, performing, by the SC, data reading or writing from the SC according to the access command.

In a possible design, the method further includes: routing the address range configuration identifier to the SC; and the processing, by the SC, the access command includes: if the SC includes no cache line corresponding to the access address, processing, by the SC, the access command according to a configuration policy corresponding to the address range configuration identifier.

In a possible design, the configuration policy corresponding to the address range configuration identifier includes one or more of the following: an allocation policy, where the allocation policy is used to indicate that data at the access address can be stored in the SC when the access command is a read command and/or a write command; a replacement policy, used to indicate a situation in which the data at the access address is replaceable; a priority policy, used to indicate a priority of the data at the access address; and a use quota, used to indicate a maximum capacity that is used by data corresponding to the address range configuration identifier in the SC.

In a possible design, the method further includes: storing the address range configuration identifier in a tag field in the cache line corresponding to the access address.

In addition, for technical effects implemented in any possible design manner in the second aspect and the third aspect, refer to the technical effects implemented in different design manners in the first aspect. Details are not described herein again.

DETAILED DESCRIPTION OF ILLUSTRATIVE EMBODIMENTS

As described in the background, for an SOC designed to include an SC, querying and matching need to be first performed on the SC for access commands of all IP cores. Consequently, an access hit rate of an IP core is relatively low, and power consumption caused during access to a chip is relatively high.

The embodiments of this application provide a system on chip, an access command routing method, and a terminal, to resolve problems in the conventional technology in which an access hit rate of an IP core is low and power consumption caused during access to a chip is high. The method and the apparatus are based on a same inventive concept. Because a problem-resolving principle of the method is similar to that of the apparatus, mutual reference may be made between an implementation of the apparatus and an implementation of the method, and no repeated description is provided.

The following first describes an application scenario in the embodiments of this application. The embodiments of this application may be applied to a terminal shown in FIG. 2.

The terminal may be a mobile terminal such as a mobile phone (or also referred to as a "cellular" phone) and a computer that corresponds to the mobile terminal. For example, the terminal may be a portable, pocket-size, hand-held, computer-built-in, or in-vehicle mobile apparatus, which exchanges voice and/or data with a radio access network. For example, the terminal may be a device such as a personal communications service (PCS) phone, a cordless phone, a session initiation protocol (SIP) phone set, a wireless local loop (WLL) station, or a personal digital assistant (PDA). The terminal may also be referred to as a system, a subscriber unit, a subscriber station, a mobile station, a mobile console, a remote station, an access point, a remote terminal, an access terminal, a user terminal, a user agent, or user equipment. This is not limited in the embodiments of this application.

Figure 1:
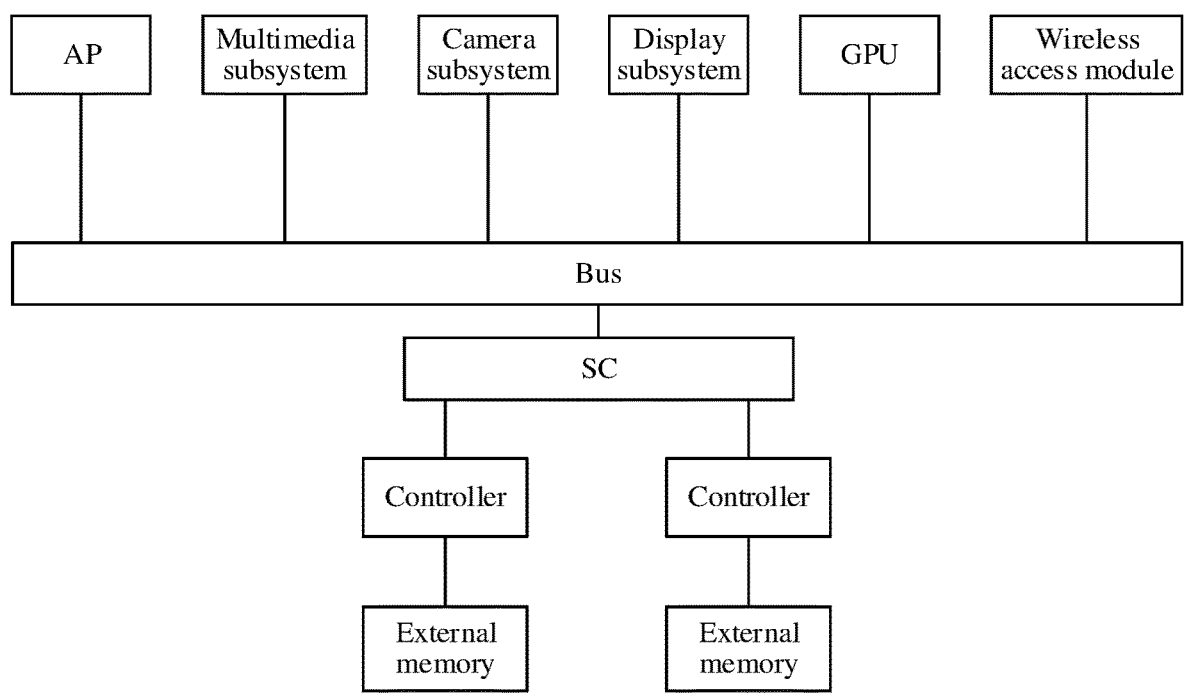
FIG. 1 is a schematic structural diagram of a system on chip according to the conventional technology.
Figure 2:
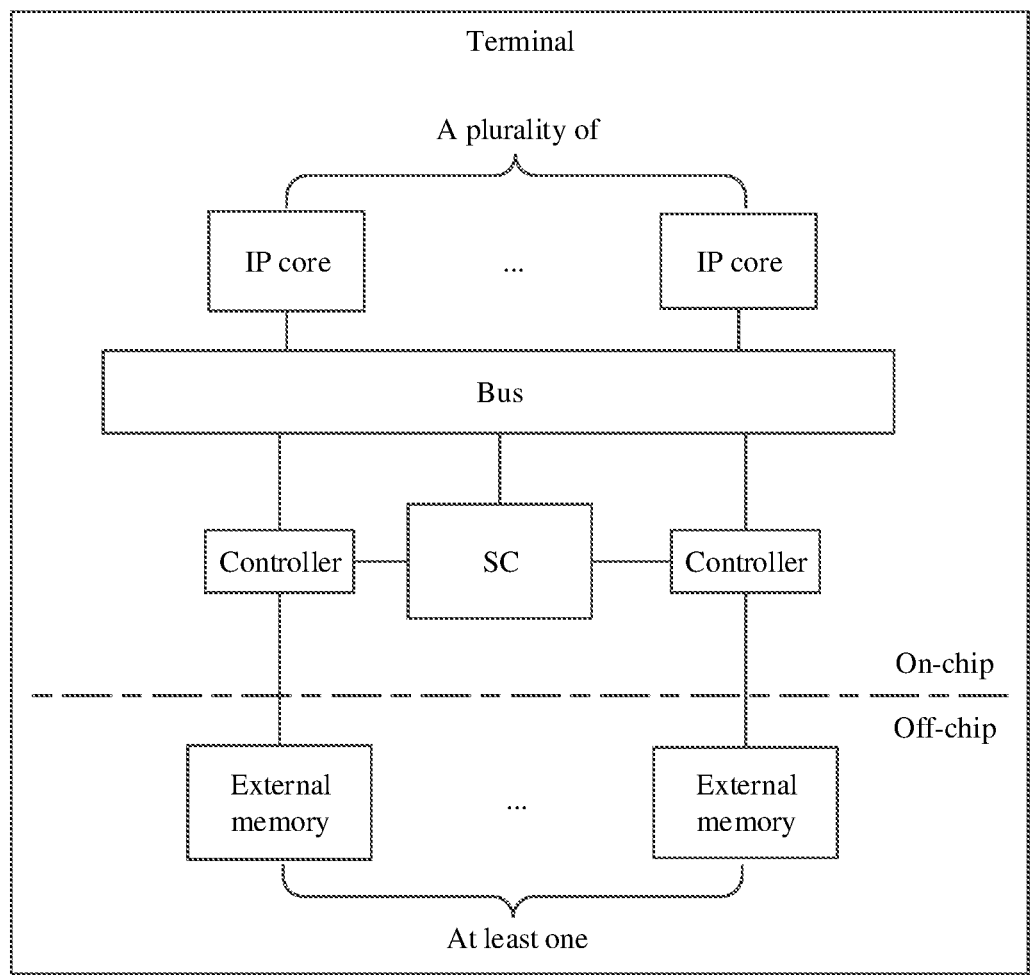
FIG. 2 is a schematic structural diagram of a terminal according to an embodiment of this application.

As shown in FIG. 2, the terminal includes a plurality of IP cores, a bus, at least one external memory connected to the bus by using a controller, and an SC. The plurality of IP cores are connected to the external memory and the SC by using the bus. The external memory is connected to the bus by using the controller. The controller is configured to control access to the memory. In addition, the SC is also connected to the external memory.

The IP core includes but is not limited to a CPU, an AP, a GPU, a multimedia subsystem, a camera subsystem, a wireless access module, and a display subsystem. The external memory includes but is not limited to a dynamic random access memory (DRAM), a synchronous dynamic random access memory (SDRAM), and a double data rate synchronous dynamic random access memory (DDR SDRAM). The SC is a last level cache (LLC) of a system. The SC can be accessed by all IP cores, and is a system shareable cache of an SOC chip. The SC may be implemented by using a static random access memory (SRAM).

For the terminal shown in FIG. 2, the external memory may be considered as an off-chip system, and the foregoing components except the external memory may be considered as an on-chip SOC chip.

After an IP core sends an access command, data exchange may be implemented by accessing the SC, or data exchange may be implemented by accessing the external memory. If the data exchange is implemented by accessing the SC, an on-chip response may be directly made to the access command, and there is no need to access the external memory. Because on-chip bandwidth is large and a data exchange rate is high, the on-chip response to the access command is relatively fast. However, when the IP core performs off-chip data access, because data needs to be exchanged through an input/output interface (I/O interface) and bandwidth of the I/O interface is small, a response to the access command is relatively slow.

In this embodiment of this application, after receiving the access command sent by the IP core, the bus does not directly perform matching from the SC, but determines, based on an address range configuration identifier sent together with the access command, whether to route the access command to the SC or to the external memory. Therefore, a case in which querying and matching are performed in the SC for all access commands can be avoided.

The following further describes in detail the embodiments of this application with reference to the accompanying drawings.

It should be noted that in the embodiments of this application, "a plurality of" means two or more. In addition, it should be understood that, in descriptions of this application, terms such as "first" and "second" are merely used for distinguishing descriptions and are neither intended to indicate or imply relative importance nor intended to indicate or imply a sequence.

Figure 3:
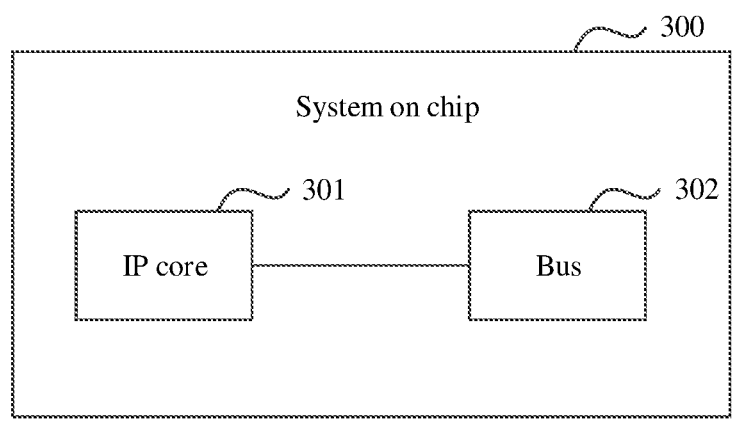
FIG. 3 is a schematic structural diagram of a system on chip according to an embodiment of this application.

FIG. 3 is a schematic structural diagram of a system on chip according to an embodiment of this application. The system on chip 300 includes an IP core 301 and a bus 302.

The IP core 301 is configured to: obtain, based on an access address corresponding to an access command, an address range configuration identifier corresponding to the access address; and transmit the access command and the address range configuration identifier to the bus 302, where the address range configuration identifier is used by the bus 302 to route the access command.

The bus 302 is configured to route the access command to an SC or an external memory based on the address range configuration identifier.

The IP core (which may also be referred to as a master in this embodiment of this application) includes but is not limited to a CPU, an AP, a GPU, a multimedia subsystem, a camera subsystem, a wireless access module, and a display subsystem. In this embodiment of this application and the accompanying drawing, the address range configuration identifier may be represented by a RID (range of identity).

In addition, the address range configuration identifier is a parameter that is set to determine a routing path for the access command in this embodiment of this application. For example, the following may be set: If a RID obtained according to an access command is a specified value, the access command is routed to the external memory; or if a RID obtained according to an access command is not a specified value, the access command is routed to the SC. During a specific implementation, correspondences between different address ranges and RIDs may be stored in the SOC or the external memory. When initiating the access command, the IP core may obtain, through querying, a RID corresponding to the access address, and then determine a routing path for the access command based on the RID.

In this embodiment of this application, each access address has a corresponding RID, and the RID may be used to indicate whether data at the access address is accessed from the SC or from the external memory. After receiving the access command and the RID, the bus 302 may determine, based on the RID, whether to route the access command to the external memory or to the SC.

It should be noted that, in this embodiment of this application, there may a case in which a plurality of access addresses correspond to one RID or a case in which one access address corresponds to one RID. This is not specifically limited in this embodiment of this application.

During a specific implementation, that the bus 302 routes the access command to an SC or an external memory based on the RID may be specifically implemented in the following manner: If the RID is the specified value, the bus 302 routes the access command to the external memory; or if the RID is a value other than the specified value, that is, is not the specified value, the bus 302 routes the access command to the SC.

The specified value may be set to o. The value other than the specified value may be 1, 2, 3, 4, or the like. Certainly, the specified value may alternatively be set to a value such as 1, 2, or 3. A specific value of the specified value is not limited in this embodiment of this application.

It is easy to understand that the IP core 301 may be configured to implement a plurality of types of services, and a system may reserve one or more segments of address spaces for each specific type of task. Therefore, in this embodiment of this application, when an IP core initiates different types of tasks, address spaces that need to be accessed by the IP core may be classified based on application scenarios of the different tasks. Specifically, the address spaces accessed by the IP core include an SC-friendly address space and an SC-unfriendly address space. During actual application, values may be assigned to RIDs corresponding to different address spaces: The specified value is assigned to a RID corresponding to the SC-unfriendly address space; and the value other than the specified value is assigned to a RID corresponding to the SC-friendly address space.

Data correspondingly stored in the SC-friendly address space is suitable for storage in the SC, and data correspondingly stored in the SC-unfriendly address space is not suitable for storage in the SC.

During a specific implementation, a manner of classifying an address space that may be accessed by the IP core and a manner of assigning a value to a RID corresponding to the address space may be considered from perspectives of a temporal limitation (for example, a frequency at which a service is initiated and a time interval at which a service of a same type is initiated again) and a spatial limitation (for example, a data amount of the service and a probability that data at an adjacent address is continuously accessed). For example, for a type of service that is initiated at a relatively high frequency, a RID corresponding to an address space reserved for the type of service may be set to the value other than the specified value; for a type of a service that is initiated at a relatively low frequency, a RID corresponding to an address space reserved for the type of service may be set to the specified value; for a type of service with a relatively small data amount, a RID corresponding to an address space reserved for the type of service may be set to the value other than the specified value; and for a type of service with a relatively large data amount, a RID corresponding to an address space reserved for the type of service may be set to the specified value.

Based on the foregoing descriptions, it is easy to learn that, in this embodiment of this application, an address space accessed by the IP core 301 includes a first part of address space and a second part of address space. A RID corresponding to the first part of address space is the specified value, and a RID corresponding to the second part of address space is the value other than the specified value. Data correspondingly stored in the first part of address space is not suitable for storage in the SC, and data correspondingly stored in the second part of address space is suitable for storage in the SC. The first part of address space may be considered as the SC-unfriendly address space, and the second part of address space may be considered as the SC-friendly address space.

In a possible implementation, the system on chip 300 shown in FIG. 3 may further include the SC, and the SC is configured to process the access command. A processing manner is to be described in detail below, and therefore details are not described herein.

In addition, if the bus 302 routes the access command to the external memory based on the RID, the external memory processes the access command. A specific processing manner is the same as that in the conventional technology, and therefore details are not described in this embodiment of this application. It should be noted that, in this embodiment of this application, because the external memory does not need to use the RID to process the access command, the bus 302 may not send the RID to the external memory, and route only the access command to the external memory. Certainly, the bus 302 may alternatively choose to route the RID to the external memory, and the external memory may discard the RID and perform no processing.

Specifically, that the SC processes the access command may be implemented in the following manner: If the SC includes a cache line corresponding to the access address, the SC performs data reading or writing from the SC according to the access command.

In other words, if the SC includes the cache line corresponding to the access address, regardless of whether the access command is a read command or a write command, the SC may directly perform a read or write operation on the corresponding cache line. Because the SC includes the cache line corresponding to the access address, the SC does not need to allocate a new cache line for the access command when executing the access command.

In addition, in this embodiment of this application, the second part of address space may be further classified into different subclasses, different configuration policies are configured for the subclasses, and then different RIDs are assigned for the different configuration policies, so that each subclass is identified by using a different RID. In this case, the SC may process the access command according to configuration policies corresponding to different RIDs.

It is easy to understand that, because a configuration policy corresponding to a RID is used by the SC to process the access command, a configuration policy corresponding to an address range configuration identifier may be stored in the SC. Specifically, the configuration policy may be stored in a RID parsing module in the SC.

It should be noted that, when the value other than the specified value is to be assigned to the RID, because there may be a plurality of values other than the specified value, a static mapping manner, a dynamic mapping manner, or a combination of the two mapping manners may be used as a value assignment manner. The static mapping manner may be understood as follows: A same RID is assigned for a same configuration policy each time. The dynamic mapping manner may be understood as follows: Different RIDs are assigned for a same configuration policy each time. The combination of the two mapping manners may be understood as: Each time values are assigned for a plurality of configuration policies, values assigned to RIDs corresponding to some configuration policies are constant, and values assigned to RIDs corresponding to other configuration policies are dynamically changed.

Therefore, in another implementation, the bus 302 is further configured to route the RID to the SC. In this case, that the SC processes the access command may be implemented in the following manner: If the SC includes no cache line corresponding to the access address, the SC processes the access command according to a configuration policy corresponding to the RID.

Specifically, the configuration policy corresponding to the RID includes one or more of the following: an allocation policy, where the allocation policy is used to indicate that data at the access address can be stored in the SC when the access command is a read command and/or a write command; a replacement policy, used to indicate a situation in which the data at the access address is replaceable; a priority policy, used to indicate a priority of the data at the access address; and a use quota, used to indicate a maximum capacity that is used by data corresponding to the RID in the SC.

The following describes the foregoing configuration policies one by one.

1. Allocation Policy

The allocation policy is used to indicate that data at the access address can be stored in the SC when the access command is a read command and/or a write command. To be specific, the allocation policy is used to indicate that a cache line in the SC can be allocated for the access command when the access command has a specific attribute (for example, read or write). For example, the allocation policy may be used to indicate that a cache line in the SC can be allocated for the access command when the access command is a read command; or the allocation policy may be used to indicate that a cache line in the SC can be allocated for the access command when the access command is a write command.

As described above, in this embodiment of this application, each access command corresponds to one access address, and each access address corresponds to one RID. The access command may be a read command, or may be a write command, and the data at the access address may be stored in the SC or may be stored in the external memory.

Corresponding to an attribute (for example, read or write) of the access command, the allocation policy may be read allocation (to be specific, a cache line in the SC may be allocated for the access command when the command is a read command, in other words, the cache line is allocated to the access address corresponding to the command; or no cache line in the SC is allocated for the access command if the command is a write command), or may be write allocation (to be specific, a cache line in the SC may be allocated for the access command when the command is a write command; or no cache line in the SC is allocated for the access command if the command is a read command), or may be read and write allocation (to be specific, when the access command is a write command or a read command, a cache line in the SC may be allocated for the command).

The following describes several specific manners in which the SC processes the access command based on the allocation policy and the attribute of the access command.

When the allocation policy is read allocation and the access command is a read command, the SC reads, from the external memory, data that is requested to be read according to the access command, and stores the data; and the SC returns, to the IP core 301, the data that is requested to be read according to the access command. As mentioned above, the read allocation means that a cache line in the SC may be allocated for the access command when the command is a read command. In this case, when the allocation policy is the read allocation and the access command is the read command, the SC may allocate the cache line for the access command, and the SC reads, from the external memory, the data that is requested to be read according to the access command, stores the data in the SC, and returns the data to the IP core 301. It should be noted that in this case, the SC reads the data from the external memory and writes the data into the SC. In other words, the data at the access address occupies the cache line in the SC.

When the allocation policy is read allocation and the access command is a write command, the SC writes, into the external memory, data that is requested to be written according to the access command. As mentioned above, the read allocation means that a cache line in the SC may be allocated for the access command when the command is a read command, or no cache line in the SC is allocated for the access command if the command is a write command. In this case, when the allocation policy is the read allocation and the access command is the write command, the SC does not allocate a cache line for the access command, and the SC writes, into the external memory, the data that is requested to be written according to the access command.

When the allocation policy is write allocation and the access command is a read command, the SC reads, from the external memory, data that is requested to be read according to the access command, and returns, to the IP core 301, the data that is requested to be read according to the access command. As mentioned above, the write allocation means that no cache line in the SC is allocated for the access command if the command is a read command. In this case, when the allocation policy is the write allocation and the access command is the read command, the SC reads, from the external memory, the data that is requested to be read according to the access command, and returns, to the IP core 301, the data that is requested to be read according to the access command. It should be noted that, in this case, although the SC reads the data from the external memory, the SC does not write the data into the SC, but directly returns the data to the IP core 301. In other words, the data at the access address does not occupy a cache line in the SC.

When the allocation policy is write allocation and the access command is a write command, the SC reads, from the external memory, data corresponding to the access address and stores the data; and the SC writes the data corresponding to the access address into the SC. As mentioned above, the write allocation means that a cache line in the SC may be allocated for the access command when the command is a write command. In this case, when the allocation policy is the write allocation and the access command is the write command, the SC reads, from the external memory, the data corresponding to the access address and stores the data, and then writes the data corresponding to the access address into the SC. In other words, in this case, the data at the access address occupies the cache line in the SC.

When the allocation policy is read and write allocation, the SC performs data reading and writing from the SC according to the access command. As mentioned above, the read and write allocation means that when the access command is a write command or a read command, a cache line in the SC may be allocated for the command. In this case, when the allocation policy is the read and write allocation, regardless of whether the access command is the read command or the write command, the cache line in the SC may be allocated for the command, and data reading and writing may be directly performed in the SC according to the access command.

It should be noted that, if the SC includes the cache line corresponding to the access address, the SC does not need to re-allocate a cache line for the access command when executing the access command, and the SC directly performs reading or writing in the corresponding cache line, without considering the allocation policy. The foregoing enumerated several cases are applicable to the case in which the SC includes no cache line corresponding to the access address.

For example, in addition to the standard read/write allocation, some special allocation policies may be configured, for example, read de-allocation (read de-allocation). The allocation policy is to clean (invalid) a cache line corresponding to the access address when a read hit occurs. Even if a read miss occurs on a read command, a cache line is not allocated for the read command. The read allocation policy and the write allocation policy may be combined. For example, the allocation policy may be write allocation+read de-allocation, which indicates that a cache line in the SC may be allocated for the access command when the command is a write command and that a cache line corresponding to the access address is cleaned when the access command is a read command and a read hit occurs.

2. Replacement Policy

The replacement policy is used to indicate a situation in which data at the access address is replaceable. When the SC is not fully occupied, after receiving the access command, the SC may allocate a cache line according to the foregoing allocation policy. However, because a capacity of the SC is limited, it is difficult for the SC to allocate a cache line for each access command after receiving the access command. When the SC is fully occupied or the capacity of the SC is insufficient, data overwriting occurs. The replacement policy is used when data overwriting occurs.

For example, if a replacement policy corresponding to a RID may be that replacement is allowed, when the SC is fully occupied or the capacity of the SC is insufficient, data at an access address corresponding to the RID can be overwritten by using other data.

For example, if a replacement policy corresponding to a RID may be that replacement is allowed for a same RID, when the SC is fully occupied or the capacity of the SC is insufficient, data at an access address corresponding to the RID can be overwritten by using data at another access address corresponding to the same RID. In other words, in this implementation, a plurality of access addresses correspond to one RID, and data at one access address may be overwritten by using data at another access address.

For example, if a replacement policy corresponding to a RID may be that higher-priority replacement is allowed, when the SC is fully occupied or the capacity of the SC is insufficient, data at an access address corresponding to the RID may be overwritten by using data with a higher priority at an access address corresponding to a RID.

For example, if a replacement policy corresponding to a RID may be that replacement is not allowed, when the SC is fully occupied or the capacity of the SC is insufficient, data at an access address corresponding to the RID cannot be overwritten by using other data.

In this embodiment of this application, the SC may further store the RID in a tag field (Tag) in the cache line corresponding to the access address. In the conventional technology, a tag field (Tag) in a cache line corresponding to an access address includes an address tag (used to indicate a tag value), a VLD field (used to indicate whether data is valid), and a CL field (used to indicate whether data stored in the SC is consistent with data stored in the external memory). In this embodiment of this application, a RID field may be further added to the tag field, used to indicate a RID corresponding to the access address in the cache line.

The RID field in the tag field may be used to determine a corresponding configuration policy based on the RID. During processing of the access command, the SC may obtain the corresponding configuration policy based on the RID, to determine a processing manner. For example, when the SC is fully occupied or the capacity of the SC is insufficient, the SC may determine, according to a priority policy corresponding to the RID field in the tag field, whether data stored in the cache line can be overwritten.

In addition, when data is written into a cache line in the SC, a RID also needs to be written into a tag field. In a scenario in which data overwriting occurs, the RID in the tag field in the cache line may be extracted, and an attribute may be parsed. If data in the cache line needs to be overwritten, the RID in the tag field in the cache line also needs to be modified and replaced correspondingly.

3. Priority Policy

The priority policy is used to indicate a priority of the data at the access address. For example, the priority policy has been described in the foregoing descriptions of the replacement policy. In a scenario in which data overwriting occurs, the priority policy may indicate a priority of data at an access address corresponding to the RID.

For example, a priority corresponding to RID=1 is 2, and the replacement policy is that higher-priority replacement is allowed. In this case, when the SC is fully occupied or the capacity of the SC is insufficient, if a priority corresponding to RID=2 is 3, data at an access address corresponding to RID=1 may be overwritten by using data at an access address corresponding to RID=2.

4. Use Quota

The use quota is used to indicate a maximum capacity that is used by data corresponding to the RID in the SC. For example, the use quota may be 1 MByte, 256 kBytes, 2 MBytes, or 128 kBytes.

The capacity of the SC is limited, and it is impossible for the SC to allow a task or an IP core to occupy a cache line in the SC unlimitedly. Therefore, this use quota policy may be set in the configuration policy corresponding to the RID. Within a limit range corresponding to the use quota, the SC may allocate a cache line for the data at the access address corresponding to the RID. When the use quota is reached, if data corresponding to the RID needs to be written into the SC, whether to overwrite other data in the SC needs to be selected according to the foregoing replacement policy or priority policy, and whether the other data in the SC can be overwritten by using the data corresponding to the RID is further determined.

In addition, the configuration policy corresponding to the RID may further include other content. This is not specifically limited in this embodiment of this application. For example, the configuration policy may further include a security attribute. The security attribute may be used to indicate security (secure or not secure) of the data at the access address corresponding to the RID.

As described above, the configuration policy corresponding to the address range configuration identifier may be preconfigured in the SC. Certainly, an application scenario of each type of task varies with an application scenario of the terminal. In this case, the configuration policy stored in the SC may be modified.

For example, as an application scenario changes, the priority policy corresponding to the RID may be dynamically modified. For example, the priority policy may be modified from 2 to 3, to increase a priority corresponding to the RID. The use quota corresponding to the RID may also be dynamically modified. For example, the use quota may be modified from 2 MBytes to 1 MByte, to reduce the use quota corresponding to the RID in the SC.

For example, it is assumed that the foregoing specified value is 0. When a non-zero RID is expected to be canceled for use, a use quota corresponding to the RID may first be set to 0, or an allocation policy corresponding to the RID may first be set to "allocation is not allowed", and then an invalid operation is performed on a cache line allocated in the SC for the RID. In this way, data in the cache line allocated in the SC for the RID is refreshed to the external memory, and then the RID is no longer used. Optionally, the RID may be modified and allocated to another address space for use based on a requirement, and a corresponding configuration policy may be configured.

It should be noted that, in the foregoing example, if the CL field in the tag field (Tag) indicates that the data in the SC is consistent with the data in the external memory, the invalid operation may be directly performed on the cache line allocated in the SC for the RID. If the CL field in the tag field indicates that the data in the SC is inconsistent with the data in the external memory, a clean operation needs to be performed on the cache line allocated in the SC for the RID, and then the invalid operation is performed on the cache line allocated in the SC for the RID. In this way, the data in the cache line allocated in the SC for the RID can be refreshed to the external memory.

The foregoing describes a principle for setting the RID, the configuration policy corresponding to the RID, and the manner for the SC to process the access command. A prerequisite for implementing the foregoing solution is as follows: After sending the access command, the IP core needs to obtain the RID corresponding to the access address. The following describes in detail the manner for the IP core to obtain the RID corresponding to the access address.

During a specific implementation, there are a plurality of types of IP cores 301. For example, an access address carried in an access command corresponding to an IP core is a virtual address; and during data access, a memory management unit (MMU) needs to translate the virtual address into a physical address by using a page table stored in the external memory, and then accesses data based on the physical address. The MMU is connected to the IP core 301 and the bus 302. During virtual-physical address translation, the MMU receives the access address (a virtual address) sent by the IP core 301, and routes the access address to the external memory through the bus 302; the external memory queries the page table for address translation; and then the MMU receives, through the bus 302, a corresponding physical address obtained through translation, and sends the corresponding physical address to the IP core 301. For another example, an access address carried in an access command corresponding to an IP core is a physical address. In this case, during data access, there is no need to perform virtual-physical address translation, but the access is directly performed based on the physical address.

For different types of IP cores, manners of setting RIDs and locations for storing the RIDs are different; and correspondingly, manners of obtaining RIDs by the IP cores are also different. For example, for an IP core that performs data access based on a virtual address, a RID may be configured in a page table, and the IP core may obtain the RID corresponding to an access address during virtual-physical address translation. For another example, for an IP core that performs data access based on a physical address, a RID may be configured in a register disposed in the IP core, and before sending an access command to the bus 302, the IP core may query the register and obtain the RID.

The following describes three manners for the IP core to obtain the RID.

Manner 1

In Manner 1, the access address is a virtual address, and that the IP core 301 obtains, based on an access address corresponding to an access command, a RID corresponding to the access address may be specifically implemented in the following manner: The IP core 301 sends the access address to an MMU, where the MMU is configured to query a page table and obtain the RID corresponding to the access address, and the page table is used to record a mapping relationship between the access address and the RID; and the IP core 301 receives the RID from the MMU.

In other words, the foregoing mapping relationship may be prestored in the page table. When the access address is the virtual address, the foregoing mapping relationship may be learned by querying the page table, and the RID corresponding to the access address may be further obtained.

In the conventional technology, the page table may be used to record a mapping relationship between a virtual address and a physical address. When the IP core initiates access to data at a virtual address, after the MMU queries the page table and translates the virtual address into a physical address, the IP core delivers the physical address to the bus as an associated signal of an access command, and then performs data access based on the physical address. In this embodiment of this application, a RID may be stored in a high-order portion of the physical address (the high-order portion of the physical address has not been occupied). After querying the page table based on the access address and obtaining the physical address, the MMU can obtain, from the high-order portion of the physical address, the RID corresponding to the access address.

In addition, in Manner 1, a RID may alternatively be stored in a dedicated bit field of the page table. The page table includes a plurality of bit fields. In addition to a bit field used to store address information, a bit field used to store attribute information is reserved in the page table. For example, the page table may include a bit field reserved for hardware, and data written into the bit field may be read by the hardware. The reserved bit field used to store the attribute information may be considered as the "dedicated bit field" in this embodiment of this application. The RID is stored in the dedicated bit field. After querying the page table based on the access address, the MMU may obtain the RID in the dedicated bit field, and further obtain the RID corresponding to the access address.

For example, one record in the page table may be a mapping relationship between a virtual address A and RID=N, where a piece of information RID=N is stored in the dedicated bit field. If the access address corresponding to the access command initiated by the IP core is the virtual address A, the MMU may determine, by querying the record in the page table, that the RID corresponding to the virtual address A is N. Then, after receiving a page table querying result sent by the MMU, the IP core may determine the piece of information RID=N. After receiving the piece of information RID=N sent by the IP core, the bus 302 may determine whether to route the access command to the SC or to the external memory.

In addition, when the bus 302 routes the access command to the SC based on RID=N, the SC may further process the access command. For a specific manner, refer to the foregoing descriptions. Details are not described herein again.

In Manner 1, the RID may be stored in the high-order portion of the physical address in the page table or stored in the dedicated bit field of the page table.

Manner 2

In Manner 2, the access address is a physical address, and that the IP core 301 obtains, based on an access address corresponding to an access command, a RID corresponding to the access address may be specifically implemented in the following manner: The IP core 301 queries a register based on the access address, and obtains the RID corresponding to the access address, where the register is disposed in the IP core 301, and the register is configured to record a mapping relationship between the access address and the RID.

In other words, when the access address is the physical address, the foregoing mapping relationship may be prestored in the register. When initiating the access command, the IP core may query the corresponding RID in the register based on the access address corresponding to the access command, and send the RID together with the access command to the bus 302.

Usually, the mapping relationship includes a plurality of consecutive physical address ranges (for example, a start address and an end address, or a start address and a length) and corresponding RID expressions. A plurality of consecutive physical addresses may correspond to one RID, or may correspond to a plurality of RIDs, respectively.

In Manner 2, an address space that may be accessed by the IP core may be classified into a plurality of subclasses, and each subclass corresponds to a different RID. For example, services initiated by the IP core have a plurality of types, and a different RID may be assigned to an address space allocated for each type of service.

Manner 3

In Manner 2, the access address is a physical address, and that the IP core 301 obtains, based on an access address corresponding to an access command, a RID corresponding to the access address may be specifically implemented in the following manner: The IP core queries, based on the access address, a register disposed in the IP core, and obtains the RID, where the register is configured to record the RID.

In other words, when the access address is the physical address, the RID may be prestored in the register. When initiating the access command, the IP core may directly query the register for a value of the RID, and send the RID together with the access command to the bus 302.

In Manner 3, a same RID is assigned to all address spaces that may be accessed by the IP core. For example, services initiated by the IP core have a relatively single type, and therefore the same RID may be assigned to all the address spaces that may be accessed by the IP core.

It can be learned from the foregoing descriptions of the three manners that, in Manner 1, the MMU may be used to set RIDs for a series of discrete physical pages; in Manner 2, a same RID or different RIDs may be separately set for several fixed consecutive physical addresses; and in Manner 3, a register configuration manner may be used, and a same RID may be set for all address spaces that may be accessed by one IP core. The access address carried in the access command initiated by the IP core is the physical address in Manner 3 and Manner 2. However, in Manner 2, services initiated by the IP core have relatively rich types, and therefore different values of RIDs may be assigned to address spaces allocated for different types of services; and in manner 3, services initiated by the IP core have a relatively single type, and therefore a same RID may be assigned to all address spaces that may be accessed by the IP core.

In conclusion, in this embodiment of this application, the IP core 301 obtains the RID corresponding to the access address, and sends the RID together with the access command to the bus 302. After receiving the RID, the bus 302 may determine whether to route the access command to the SC or to the external memory. In the solution provided in this embodiment of this application, a case in which querying and matching need to be first performed in the SC for all access commands can be avoided, an access hit rate of the IP core can be increased, and power consumption of the system can be reduced.

Figure 4:
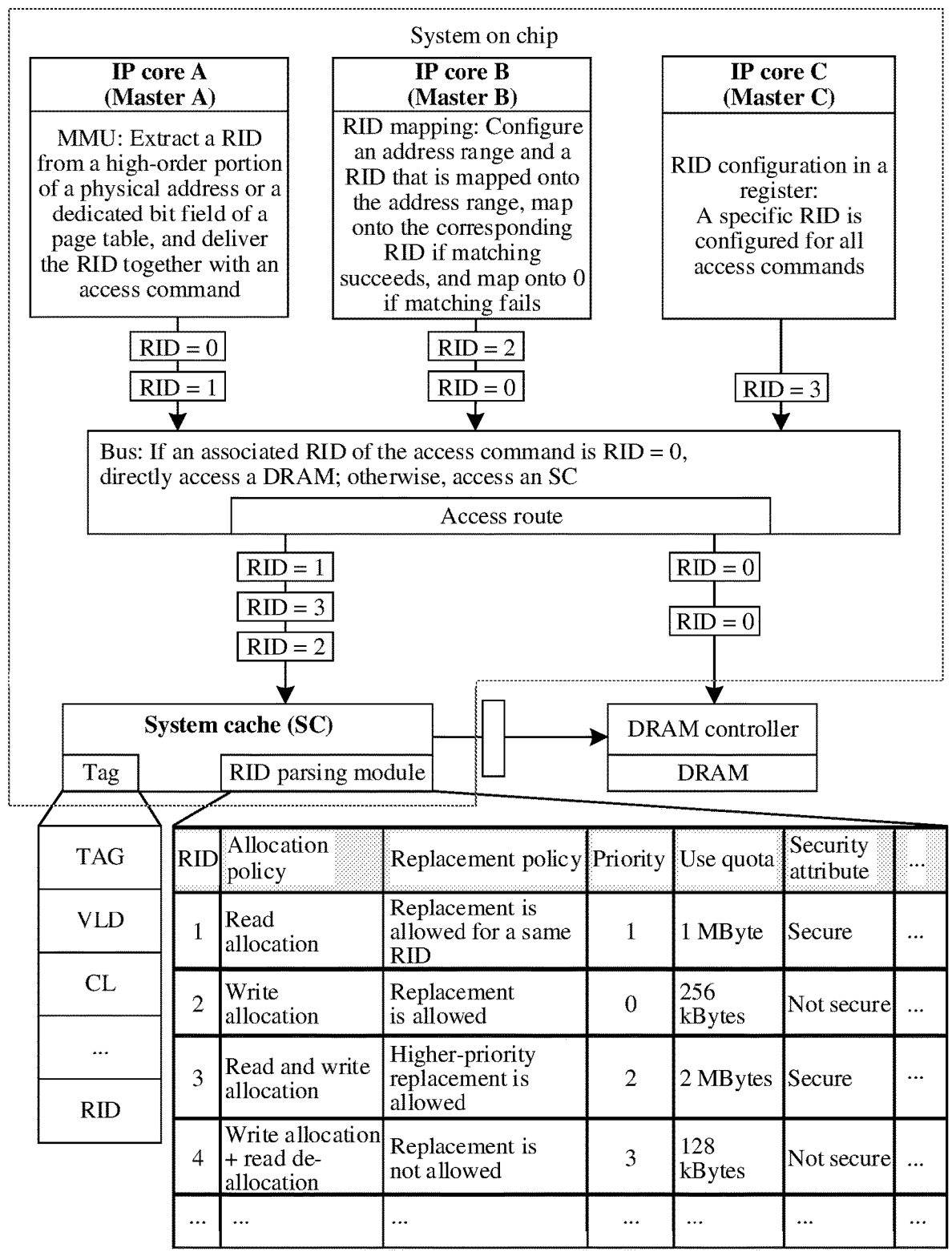
FIG. 4 is a schematic structural diagram of another system on chip according to an embodiment of this application.

Based on the foregoing embodiment, an embodiment of this application further provides a system on chip. As shown in FIG. 4, the system on chip includes a master A, a master B, a master C, a bus, and an SC. In addition, the system on chip is located in a terminal, and the terminal may further include a DRAM (where the DRAM includes a DRAM controller).

The master is an example of the foregoing IP core. The master A, the master B, and the master C are three different types of IP cores, and configuration policies corresponding to RIDs corresponding to the master A, the master B, and the master C are different. For details, refer to descriptions in FIG. 4. When sending an access command, the IP core also sends a corresponding value of a RID together to the bus. The bus routes the access command to the DRAM when the associated RID of the access command is equal to 0, and the DRAM processes the access command in a manner in the conventional technology. The bus routes the RID and the access command to the SC when the associated RID of the access command is not equal to 0. A tag and a RID parsing module are configured for the SC. A tag field includes an address tag, a VLD field, a CL field, and a RID field. For meanings of these fields, refer to the foregoing descriptions. Details are not described herein again. The RID parsing module is configured to: after receiving the access command and the associated RID, obtain, through parsing, a configuration policy corresponding to the RID. The SC may process the access command according to the corresponding configuration policy. A specific processing manner has been described in the embodiment of the system on chip 300 shown in FIG. 3. Details are not described herein again.

The following uses the master A in the system on chip shown in FIG. 4 as an example to describe application steps of the master A in detail.

Step 1: Memory spaces that need to be used are analyzed based on an application scenario, and classification is performed based on behavior of access to these memory spaces and based on whether these memory spaces are friendly to a system cache (namely, a temporal locality and a spatial locality during the access).

Step 2: A configuration policy (an SC use quota, an allocation policy, a replacement policy, a priority, or security) is further used for a cache-friendly space, to classify the cache-friendly space into different subclasses.

Step 3: After different SC application space subclasses are obtained in step 2, different non-zero RIDs are mapped onto the different SC application space subclasses. A static mapping manner, a dynamic mapping manner, or a combination of the two mapping manners may be used for mapping, and RID=o is directly configured for an SC-unfriendly address space obtained in step 1.

Step 4: A corresponding configuration policy is set in a configuration table of the RID parsing module of the SC for the non-zero RID allocated in step 3.

Step 5: A RID parameter is added to a function for applying an address space from a system, where the RID parameter is written into a last level page table of the applied address space.

Specifically, the RID parameter may be recorded in a high order portion of an unused physical address or in a dedicated bit field in a page table; and only one RID is allowed to be configured for a same physical address space at a same moment.

Step 6: When an MMU performs virtual-physical address translation for an access command from the master A, the MMU extracts the RID recorded in the page table (which is written into the page table in step 5), and supports in sending the RID to a downstream (the bus) as an associated signal of the access command.

Step 7: The bus separately routes, based on whether the associated RID of the access command is 0, the access command to the SC (RID !=0) or to the DRAM (RID=0).

Step 8: For an access command that arrives at the SC, a specific configuration policy is obtained through parsing based on the associated RID of the access command. If a new cache line needs to be allocated for the access command, the RID should be stored in the RID field in the tag field. If an old cache line needs to be overwritten for the access command, a RID corresponding to the old cache line is extracted from the tag field, then various attributes are obtained through parsing, and corresponding processing is performed.

Step 9: The DRAM processes an access command corresponding to RID=0; and in this case, the information RID=0 is meaningless to a processing process of the DRAM.

Step 10: As an application scenario changes, software may dynamically modify the configuration policy corresponding to the RID in the system cache, for example, modify a priority or modify a use quota.

Step 11: When a non-zero RID is expected to be canceled for use, an allowed use quota corresponding to the RID is first set to 0, and then a clean and invalid operation is performed on a cache line allocated for the RID in the SC; and optionally, an address originally allocated for the RID may be modified to a RID that is equal to 0 or another non-zero RID.

It should be noted that the system on chip shown in FIG. 4 may be considered as a specific example of the system on chip 300 shown in FIG. 3. For an implementation that is of the system on chip shown in FIG. 4 and that is not described in detail, refer to the related descriptions of the system on chip 300.

Figure 5:
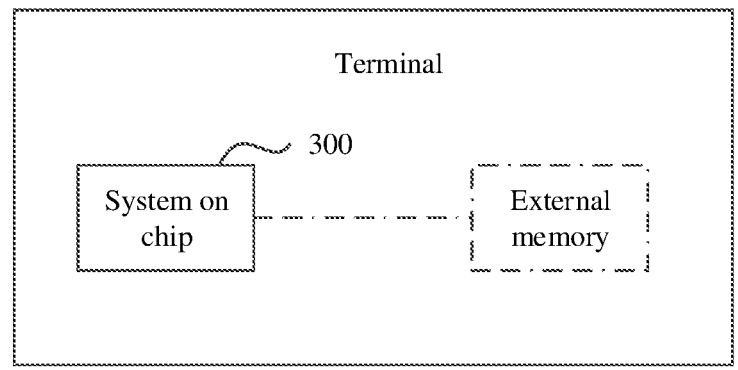
FIG. 5 is a schematic structural diagram of a terminal according to an embodiment of this application.

In addition, an embodiment of this application further provides a terminal. As shown in FIG. 5, the terminal includes the system on chip 300 shown in FIG. 3.

Optionally, the terminal may further include an external memory. The external memory is configured to implement an operation performed by the external memory in the example in FIG. 3.

The terminal may be deployed on land, including an indoor device, an outdoor device, a handheld device, or a vehicle-mounted device, may be deployed on a water surface (for example, on a ship), or may be deployed in the air (for example, on an aircraft, a balloon, or a satellite). The terminal may be a mobile phone, a tablet computer (pad), a computer having a wireless transceiver function, a virtual reality (VR) terminal, an augmented reality (AR) terminal, a wireless terminal in industrial control (industrial control), a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

Figure 6:
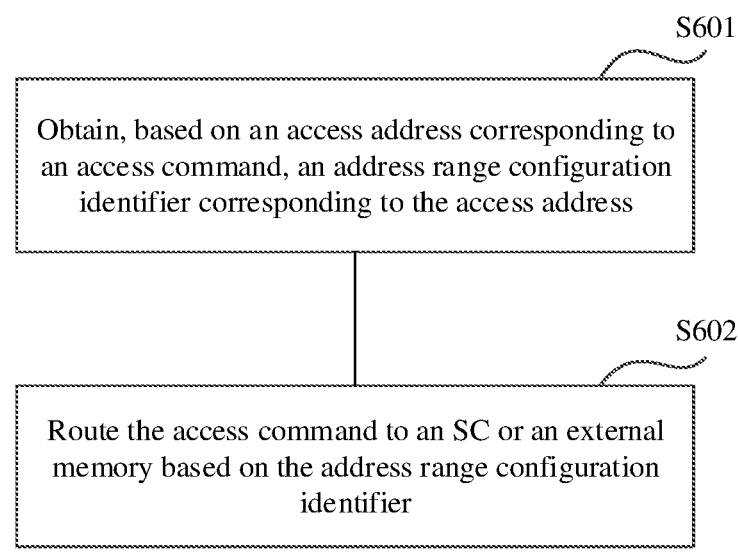
FIG. 6 is a schematic flowchart of an access command routing method according to an embodiment of this application.

Based on a same inventive concept, an embodiment of this application provides an access command routing method. As shown in FIG. 6, the method includes the following steps:

S601: Obtain, based on an access address corresponding to an access command, an address range configuration identifier corresponding to the access address.

The address range configuration identifier is used by a bus to route the access command.

S602: Route the access command to an SC or an external memory based on the address range configuration identifier.

Optionally, an address space accessed by an IP core includes a first part of address space and a second part of address space, where an address range configuration identifier corresponding to the first part of address space is a specified value, an address range configuration identifier corresponding to the second part of address space is a value other than the specified value, data correspondingly stored in the first part of address space is not suitable for storage in the SC, and data correspondingly stored in the second part of address space is suitable for storage in the SC.

Optionally, the routing the access command to an SC or an external memory based on the address range configuration identifier includes: routing the access command to the external memory if the address range configuration identifier is the specified value; or routing the access command to the SC if the address range configuration identifier is the value other than the specified value.

Optionally, the method further includes: processing, by the SC, the access command.

Optionally, the processing, by the SC, the access command includes: if the SC includes a cache line corresponding to the access address, performing, by the SC, data reading or writing from the SC according to the access command.

Optionally, the method further includes: routing the address range configuration identifier to the SC; and the processing, by the SC, the access command includes: if the SC includes no cache line corresponding to the access address, processing, by the SC, the access command according to a configuration policy corresponding to the address range configuration identifier.

In addition, for another implementation of the method shown in FIG. 6, refer to the related descriptions of the system on chip 300. Details are not described herein again.

What is claimed is:

1. A system on chip (SOC), comprising:
an intellectual property (IP) core; and
a bus;
wherein the IP core is configured to:
obtain, based on an access address corresponding to an access command, an address range configuration identifier corresponding to the access address; and
transmit the access command and the address range configuration identifier to the bus; and
wherein the bus is configured to route the access command to a system cache (SC) or an external memory based on the address range configuration identifier, wherein a first path of the bus is connected to the SC, and a second path of the bus is connected to a controller for routing to the external memory.

2. The system on chip according to claim 1, wherein an address space accessed by the IP core comprises a first part of address space and a second part of address space, an address range configuration identifier corresponding to the first part of address space is a specified value, an address range configuration identifier corresponding to the second part of address space is a value other than the specified value, data correspondingly stored in the first part of address space is stored in the SC, and data correspondingly stored in the second part of address space is stored outside of the SC.

3. The system on chip according to claim 2, wherein the bus is configured to:
route the access command to the external memory in response to the address range configuration identifier being the specified value; or
route the access command to the SC in response to the address range configuration identifier being the value other than the specified value.

4. The system on chip according to claim 1, wherein the access address is a virtual address, and the IP core is configured to:
send the access address to a memory management unit (MMU), wherein the MMU is configured to query a page table and obtain the address range configuration identifier, and the page table records a mapping relationship between the access address and the address range configuration identifier; and
receive the address range configuration identifier sent by the MMU.

5. The system on chip according to claim 4, wherein the MMU is configured to query the page table based on the access address and obtains a physical address, and the address range configuration identifier is stored in a high-order portion of the physical address.

6. The system on chip according to claim 1, wherein the access address is a physical address, and the IP core is configured to:
query a register based on the access address, and obtain the address range configuration identifier corresponding to the access address, wherein the register is disposed in the IP core, and the register records a mapping relationship between the access address and the address range configuration identifier.

7. The system on chip according to claim 1, further comprising:
the SC, configured to process the access command in response to receiving the access command.

8. The system on chip according to claim 7, wherein the SC is configured to:
in response to receiving the access command, when the SC comprises a cache line corresponding to the access address, perform data reading or writing from the SC according to the access command.

9. The system on chip according to claim 7, wherein the bus is further configured to:
route the address range configuration identifier to the SC; and
wherein the SC is configured to:
in response to receiving the access command, when the SC comprises no cache line corresponding to the access address, process the access command according to a configuration policy corresponding to the address range configuration identifier.

10. The system on chip according to claim 9, wherein the configuration policy corresponding to the address range configuration identifier comprises one or more of the following:
- an allocation policy, wherein the allocation policy indicates that data at the access address is allowed to be stored in the SC when the access command is a read command or a write command;
- a replacement policy indicating a situation in which the data at the access address is replaceable;
- a priority policy indicating a priority of the data at the access address; or
- a use quota indicating a maximum capacity that is allowed to be by data corresponding to the address range configuration identifier in the SC.

11. The system on chip according to claim 10, wherein the SC is further configured to:
- store the address range configuration identifier in a tag field in the cache line corresponding to the access address.

12. A terminal, comprising a system on chip (SOC), the SOC comprising:
- an intellectual property (IP) core; and
- a bus;
- wherein the IP core is configured to:
  - obtain, based on an access address corresponding to an access command, an address range configuration identifier corresponding to the access address; and
  - transmit the access command and the address range configuration identifier to the bus; and
- wherein the bus is configured to route the access command to a system cache (SC) or an external memory based on the address range configuration identifier, wherein a first path of the bus is connected to the SC, and a second path of the bus is connected to a controller for routing to the external memory.

13. The terminal according to claim 12, wherein an address space accessed by the IP core comprises a first part of address space and a second part of address space, an address range configuration identifier corresponding to the first part of address space is a specified value, an address range configuration identifier corresponding to the second part of address space is a value other than the specified value, data correspondingly stored in the first part of address space is stored in the SC, and data correspondingly stored in the second part of address space is stored outside of the SC.

14. The terminal according to claim 13, wherein the bus is configured to:
- route the access command to the external memory in response to the address range configuration identifier being the specified value; or
- route the access command to the SC in response to the address range configuration identifier being the value other than the specified value.

15. A method, comprising:
- obtaining, by a system on chip (SOC) based on an access address corresponding to an access command, an address range configuration identifier corresponding to the access address; and
- routing, by a bus of the SOC, the access command to a system cache (SC) or an external memory based on the address range configuration identifier, wherein a first path of the bus is connected to the SC, and a second path of the bus is connected to a controller for routing to the external memory.

16. The method according to claim 15, wherein an address space accessed by an intellectual property (IP) core of the SOC comprises a first part of address space and a second part of address space, an address range configuration identifier corresponding to the first part of address space is a specified value, an address range configuration identifier corresponding to the second part of address space is a value other than the specified value, data correspondingly stored in the first part of address space is not stored in the SC, and data correspondingly stored in the second part of address space is stored in the SC.

17. The method according to claim 16, wherein routing the access command to the SC or the external memory based on the address range configuration identifier comprises:
- routing the access command to the external memory in response to the address range configuration identifier being the specified value; or
- routing the access command to the SC in response the address range configuration identifier being the value other than the specified value.

18. The method according to claim 15, further comprising:
- processing, by the SC, the access command in response to receiving the access command.

19. The method according to claim 18, wherein processing, by the SC, the access command in response to receiving the access command comprises:
- in response to receiving the access command, when the SC comprises a cache line corresponding to the access address, performing, by the SC, data reading or writing from the SC according to the access command.

20. The method according to claim 18, further comprising:
- routing the address range configuration identifier to the SC; and
- wherein processing, by the SC, the access command in response to receiving the access command comprises:
- in response to receiving the access command, when the SC comprises no cache line corresponding to the access address, processing, by the SC, the access command according to a configuration policy corresponding to the address range configuration identifier.

* * * * *